(12) United States Patent
Narholz et al.

(10) Patent No.: US 9,903,654 B2
(45) Date of Patent: *Feb. 27, 2018

(54) APPARATUS FOR PRE-HEATING A METAL CHARGE FOR A MELTING PLANT AND CONNECTED METHOD

(71) Applicant: DANIELI & C. OFFICINE MECCANICHE SPA, Buttrio (IT)

(72) Inventors: Thomas Narholz, Feldmeilen (CH); Bernard Villemin, Eggenwil (CH)

(73) Assignee: DANIELI & C. OFFICINE MECCANICHE SPA, Buttrio (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,952

(22) Filed: Apr. 26, 2016

(65) Prior Publication Data

US 2016/0252304 A1 Sep. 1, 2016

Related U.S. Application Data

(63) Continuation of application No. 13/992,956, filed as application No. PCT/IB2010/003197 on Dec. 10, 2010, now Pat. No. 9,335,096.

(51) Int. Cl.
*F27D 3/00* (2006.01)
*F27B 3/18* (2006.01)
(Continued)

(52) U.S. Cl.
CPC ............... *F27B 3/18* (2013.01); *C21C 5/527* (2013.01); *F27B 3/183* (2013.01); *F27D 3/0024* (2013.01);
(Continued)

(58) Field of Classification Search
CPC .............................. F27D 13/002; C21C 5/567
(Continued)

(56) References Cited

U.S. PATENT DOCUMENTS

| | | |
|---|---|---|
| 3,301,662 A | 1/1967 | Ban |
| 4,083,675 A | 4/1978 | Fellnor et al. |

(Continued)

FOREIGN PATENT DOCUMENTS

| | | |
|---|---|---|
| CN | 1086894 | 5/1994 |
| DE | 102008037111 | 2/2010 |

(Continued)

OTHER PUBLICATIONS

International Search from U.S. Appl No. PCT/IB2010/003197 dated Mar. 28, 2011.

(Continued)

*Primary Examiner* — Scott Kastler
(74) *Attorney, Agent, or Firm* — Calfee Halter & Griswold LLP (57) ABSTRACT

Apparatus for pre-heating and conveying a metal charge to a container of a melting plant, comprising at least a conveyor channel along which said metal charge is able to advance so as to be delivered to the container, and in which above said conveyor channel at least a hood is disposed which defines a tunnel inside which at least part of the fumes exiting from said container are able to advance. At least a zone of the hood comprises an expansion chamber located above at least a portion of said metal charge, and able to expand and keep said fumes inside it for a minimum desired time of at least 1.5 seconds before they go into contact with the metal charge.

11 Claims, 4 Drawing Sheets

(51) Int. Cl.
*C21C 5/52* (2006.01)
*F27D 13/00* (2006.01)
*F27D 17/00* (2006.01)
*F27D 99/00* (2010.01)

(52) U.S. Cl.
CPC ......... *F27D 13/002* (2013.01); *F27D 17/001* (2013.01); *F27D 17/002* (2013.01); *F27D 17/004* (2013.01); *F27D 17/008* (2013.01); *F27D 99/00* (2013.01); *C21C 2005/5282* (2013.01); *F27M 2001/02* (2013.01); *F27M 2001/10* (2013.01); *F27M 2003/02* (2013.01); *Y02P 10/216* (2015.11)

(58) Field of Classification Search
USPC ........................................................ 266/903
See application file for complete search history.

(56) References Cited

U.S. PATENT DOCUMENTS

| | | | |
|---|---|---|---|
| 4,135,702 A | | 1/1979 | Venetta et al. |
| 5,647,288 A | * | 7/1997 | Matsumoto ............. C21C 5/565 110/228 |
| 9,316,444 B2 | * | 4/2016 | Narholz ................ F27D 17/002 |
| 9,335,096 B2 | * | 5/2016 | Narholz .................. C21C 5/527 |
| 9,638,467 B2 | * | 5/2017 | Narholz ................ F27D 13/002 |
| 2010/0028821 A1 | | 2/2010 | Gavenda et al. |
| 2013/0328251 A1 | | 12/2013 | Narholz et al. |
| 2014/0010255 A1 | * | 1/2014 | Narholz .................. C21C 5/527 373/80 |

FOREIGN PATENT DOCUMENTS

| | | |
|---|---|---|
| IT | 1359081 | 3/2005 |
| JP | 8157930 | 6/1996 |
| JP | 08157930 A * | 6/1996 |
| JP | 08285477 | 6/1996 |
| JP | 09159376 A | 6/1997 |
| WO | 9409332 | 4/1994 |
| WO | 2006089897 | 2/2006 |
| WO | 2006089867 | 8/2006 |
| WO | 2011091685 A1 | 8/2011 |

OTHER PUBLICATIONS

Written Opinion from U.S. Appl. No. PCT/1132010/003197 dated Mar. 28, 2011.
Notice of Preliminary Rejection from Korean Patent Application No. 10-2013-7017798 (including English Translation), dated Jun. 27, 2014.
Office Action from Chinese Application No. 201080071198.2 dated Nov. 19, 2014.
Office Action from Mexican Patent Application No. MX/A/2013/006397 dated Jan. 7, 2015.
International Search Report from Application No. PCT/IB2010/003206 dated Aug. 25, 2011.
Written Opinion from Application No. PCT/IB2010/003206 dated Aug. 25, 2011.
International Search Report from Application No. PCT/IB2010/003207 dated Sep. 27, 2011.
Written Opinion from Application No. PCT/IB2010/003207 dated Sep. 27, 2011.
Office Action from U.S. Appl. No. 13/992,985 dated Dec. 18, 2014.
Response to Office Action from U.S. Appl. No. 13/992,985 dated Mar. 11, 2015.
Office Action from U.S. Appl. No. 13/993,011 dated Aug. 20, 2015.
Office Action from U.S. Appl. No. 13/992,985 dated May 22, 2015.
Response to Office Action from U.S. Appl. No. 13/992,985 dated Sep. 3, 2015.
Response to Office Action from U.S. Appl. No. 13/993,011 dated Nov. 20, 2015.
Notice of Allowance from U.S. Appl. No. 13/993,011 dated Dec. 15, 2015.
Office Action from U.S. Appl. No. 13/992,956 dated Mar. 19, 2015.
Response to Office Action from U.S. Appl. No. 13/992,956 dated Aug. 19, 2015.
Office Action from U.S. Appl. No. 13/992,956 dated Sep. 24, 2015.
Response to Office Action from U.S. Appl. No. 13/992,956 dated Dec. 22, 2015.
Notice of Allowance from U.S. Appl. No. 13/992,956 dated Jan. 15, 2016.

* cited by examiner fig. 3 fig. 2 fig. 6 fig. 5 fig. 9 fig. 8

APPARATUS FOR PRE-HEATING A METAL CHARGE FOR A MELTING PLANT AND CONNECTED METHOD

CROSS-REFERENCE TO RELATED APPLICATION

This application is a Continuation of U.S. application Ser. No. 13/992,956, filed Aug. 28, 2014, and now issued U.S. Pat. No. 9,335,096, which is the U.S. national phase entry of PCT/IB2010/003197, with an international filing date of 10 Dec. 2010, the entire disclosures of which are fully incorporated herein by reference.

FIELD OF THE INVENTION

The present invention concerns an apparatus, and the connected method, for conveying and pre-heating a metal charge, such as iron scrap, hot or cold sponge iron (DRI), pig iron or other, which metal charge is then loaded inside a container, which can be a melting furnace, for example an electric arc furnace.

BACKGROUND OF THE INVENTION

Apparatuses of the vibratory or oscillating type are known, to convey a metal charge to a container of a melting plant, which container can be for example a melting furnace.

Such known apparatuses provide a segment long enough to pre-heat the metal charge sufficiently, by means of fumes exiting from the furnace, while it is being conveyed.

Each of the known apparatuses comprises a bearing structure on which a conveyor channel is mounted, having a substantially U-shaped cross section.

At least part of the conveyor channel is covered at the upper part by one or more hoods that define a tunnel into which the fumes exiting from the melting furnace flow, in the direction opposite to that in which the metal charge advances, and carry out the pre-heating.

These known apparatuses have the disadvantage, however, that despite the large quantity of fumes that are introduced into the tunnel covering the conveyor channel, at a relatively high temperature, in the range of 1300° C.-1400° C., only the upper layer of the metal charge, that is, the layer that is directly hit by the stream of fumes, is able to be adequately heated. The part below remains cold, or reasonably cold.

Therefore, a considerable fraction of the energy content of the fumes is not adequately used to heat the metal charge, and therefore the fumes leave the pre-heating tunnel at a temperature that is still rather high, and the metal charge exits from the conveyor channel at an average temperature of less than 100° C., even if the upper layer can reach higher temperatures.

Apparatuses are also known, for example from WO-A-94/09332, or from IT-B-1359081, in which in order to promote the distribution of the fumes and hence of the heat over the whole height of the metal charge, suction means are disposed on the lower wall or lateral walls of the conveyor channel, which take in a part of the fumes, obliging them to pass through the metal charge from the top to the bottom. In these known solutions, the fumes taken in then converge in the main discharge pipe.

However, in known solutions, the normal hoods that define the tunnel are disposed to cover the conveyor channel defining a space for the fumes to pass between the upper part of the mass of scrap and an internal surface thereof.

The passage space thus defined has a volume unrelated to the internal volume of the melting furnace and to the average quantity of fumes generated, so that the fumes transit at a high speed and remain for a short time in contact with the metal charge.

Even the solution that provides that the metal charge is hit by the fumes does not solve the problem, because it entails an excessive heating of the metal charge limited to the zone where it is introduced into the furnace; in fact, an excessive heating can cause localized melting in the charge, or possible explosions caused by the high temperatures and by the fact that the fumes are not completely combusted.

Localized melting, especially if it occurs in the zone where the charge is introduced into the melting furnace, can entail the formation of compact blocks of metal charge that cause blockages of the conveyor channel, with consequent long and complex maintenance interventions on the plant.

Another disadvantage of known solutions is that some gases present in the fumes, for example carbon monoxide (CO), remain unburned, and therefore need further processing before they are introduced into the atmosphere.

Furthermore, given the high speed of the fumes in transit in the tunnel, most of the particulate present in the fumes remains in the stream of fumes, so that the particulate and the suspended powders pass through the tunnel, requiring at exit specific filtering actions and possible recovery, with an increase in the costs and times in both producing, managing and maintaining the plant.

Moreover, the high temperature at which the fumes impact against the metal charge inside the tunnel causes oxidation of the scrap itself, requiring a greater energy consumption in order to melt them in the melting furnace; this also causes a loss of material, with a reduction in the yield of the metal charge.

One purpose of the present invention is to achieve an apparatus for conveying and, at the same time, pre-heating a metal charge in a melting plant, which has a high yield, that is, such that the heat energy given up by the fumes to the metal charge is as high as possible and, at the same time, the scrap can be heated uniformly, preventing, as much as possible, any oxidation thereof.

Another purpose of the present invention is to achieve an apparatus for conveying and pre-heating a metal charge which allows substantially both the complete combustion of the non-combusted gases and also, advantageously, the precipitation onto the metal charge of the particulate and powders present in the fumes arriving from the melting furnace.

Another purpose of the present invention is to achieve an apparatus that has limited management and maintenance costs compared with the state of the art.

Yet another purpose is to achieve an apparatus that has a limited environmental impact, in which the powders have already been largely filtered from the gases sent outside.

SUMMARY OF THE INVENTION

The independent claims set forth and characterize the present invention, while the dependent claims describe other characteristics of the invention or variants to the main inventive idea.

A conveying and pre-heating apparatus according to the present invention serves to convey, in a generally known manner, a metal charge toward a container of a melting device, in quantities that can reach and exceed 8 tons a minute. The apparatus comprises at least a conveyor channel, along which the metal charge is made to advance toward the melting device.

The conveyor channel comprises a bottom wall, on which the metal charge is disposed, and lateral containing walls.

Above the conveyor channel, in a known manner, at least a hood is disposed, which defines a tunnel inside which the fumes produced by the melting device or melting furnace are conveyed, in a known manner, in order to preheat the metal charge.

In one form of embodiment, in at least one segment or zone of the conveyor channel, advantageously the zone bordering the entrance of the metal charge, in correspondence with the lateral walls, the apparatus is provided with means to discharge the fumes, so that the latter pass through the metal charge, carrying out a pre-heating practically over a large part of its height.

In at least the segment or zone where the fumes are taken in through the lateral walls of the conveyor channel, a tunnel or expansion chamber is provided, disposed above the metal charge in a distinct position, communicating with the tunnel. The fumes are thus conveyed inside the expansion chamber and are considerably slowed down, as they are made to remain inside the expansion chamber for at least a desired minimum time, so that the combustion of the fumes is substantially completed.

The internal volume of the expansion chamber, according to the invention, is correlated to the internal volume and/or quantity of fumes generated by the melting furnace, so that the fumes, once inside the expansion chamber, are subjected to an expansion such as to induce a desired and consistent reduction in their speed, which facilitates the release of the particulate and powders that fall onto the metal charge, returning inside the melting furnace with it.

To give an example, the fumes are made to remain inside the expansion chamber for a time comprised between 1.5 seconds and 6 seconds, advantageously at least ⅔ seconds before impacting against the metal charge and passing through it.

The volume of the expansion chamber according to the invention, and the expansion of the fumes that takes place inside it, also allow to distribute the mass of fumes, in advance and uniformly, above a large segment of metal charge, to stabilize and make uniform the temperature thereof, and therefore to allow its uniform passage through the metal charge, so as to actuate an extended and considerable heating of the metal charge.

A variant of the invention provides that the section of the expansion chamber is longitudinally variable and decreasing in counter-flow to the direction of advance of the fumes.

To give an example, the expansion determined by the expansion chamber leads to a reduction in temperature of the fumes from about 1300° C.-1400° C. when entering the chamber to a temperature of about 800° C.-1000° C. when they contact the metal charge. Again as an example, the speed in the expansion chamber passes from about 40 m/s to a speed comprised between about 6 m/s and 18 m/s, advantageously around 10 m/s and about 14 m/s. These speeds, according to the invention, can also be maintained as factors for the passage of the metal charge.

These temperatures and the reduced speed, plus the fact that the fumes pass through the advancing metal charge, determine a homogeneous heating of the metal charge. The reduced temperature drastically reduces possible localized melting of the metal charge.

In this way it is possible to obtain a homogeneous heating of the metal charge taking it to about 600° C.-750° C.

The reduction in temperature is such that the accelerated oxidation effects in the metal charge are also reduced, with a consequent reduction in the energy consumption of the plant for melting the metal charge, and an increased yield of the latter.

Simply to give an example, with an apparatus according to the invention we obtain an average saving from about 30 kWh/t up to about 60 kWh/t of electric energy.

With the solution according to the present invention at least the need for filtering and processing of the fumes before they are discharged into the atmosphere is drastically reduced.

The present invention also allows that some noble elements present in the particulate and powders transiting with the fumes, such as for example zinc (Zn), are recovered by sedimentation on the metal charge and returned inside the melting furnace.

The reduction in the filtering, in the processing of the fumes and in the oxidation, lead to a reduction in both costs and times of production, management and maintenance of the plant.

Applicant has found that the energy recovered with the solution according to the present invention allows to reduce the tap-to-tap time by about 4-5 minutes, with a consequent increased productivity of the plant.

According to a variant, the volume of the expansion chamber is comprised between about 200 m$^3$ and about 600 m$^3$.

However, it must be remembered that this volume can vary, as it is a function of the internal volume of the container and/or the quantity of fumes produced therein, as well as the desired degree of expansion.

According to another variant, the plant comprises at least a melting furnace provided with a lateral loading aperture, into which the conveyor channel faces so as to introduce the metal charge inside the melting furnace. In this variant, the melting furnace typically has an upper exit to discharge the fumes, and the invention provides a fluid connection pipe between the fume discharge exit and the expansion chamber, so that the fumes generated inside the melting furnace are introduced directly into the expansion chamber, substantially avoiding the passage through the conveyor channel.

In this variant solution, the metal charge remains substantially outside the range of the hot fumes exiting from the melting furnace, at least until they have been subjected to expansion as defined by the expansion chamber.

The variant solution allows to reduce localized melting of the metal charge, preventing the formation of blocks of metal charge that can lead to blockages of the conveyor channel.

According to another variant, inside the expansion chamber a plurality of partitions are provided, or other similar or comparable elements, able to define a mechanical contrast to the movement of the fumes, so as to condition the expansion steps and the release of the particulate and powders.

According to another variant, the internal surfaces of the at least one lateral wall and the covering wall are lined by an insulation layer, for example made of refractory material, to condition the variation in temperature of the fumes after expansion.

According to another variant, at least part of the internal surfaces of the expansion chamber are provided with cooling members, for example a coil, to condition the variation in temperature of the fumes after expansion.

According to another variant, at least a burner is provided, disposed inside the expansion chamber to cause or accelerate the post-combustion of the gases, advantageously cooperating with the fume entry zone.

According to another variant, one or more nozzles are provided, able to nebulize a desired quantity of water into the fumes entering the expansion chamber, so as to carry out an active control of the temperature of the fumes at inlet. This solution allows to lower and control any possible thermal peaks of the fumes, which occur in the different steps of the melting cycle.

According to another variant, the lateral fume discharge means comprise at least a suction pipe, associated externally with the lateral walls of the conveyor channel, the at least one suction pipe being in a single piece with the lateral walls of the conveyor channel.

In another form of embodiment, the at least one fume suction pipe is connected to but independent of the conveyor channel, so that the latter can be made to vibrate autonomously during the transfer steps of the metal charge.

Suction means, possibly provided with suction regulation means, can be advantageously associated with the suction pipes so as to promote and regulate the stream of fumes and hence the temperature of the metal charge.

At least one of the lateral walls is advantageously provided with at least an aperture or slit which puts the conveyor channel in communication with the corresponding suction pipe in order to discharge the fumes.

The aperture or slit, according to a variant, can also affect part of the bottom wall of the expansion chamber in order to better control the time the fumes remain within.

According to another variant, vibratory members are associated with the suction pipes, able to limit the deposit of powders and other impurities inside the respective lateral compartments.

BRIEF DESCRIPTION OF THE DRAWINGS

These and other characteristics of the present invention will become apparent from the following description, given as a non-restrictive example with reference to the attached drawings wherein.

In the attached drawings, the same reference numbers have been used, where possible, to identify common elements that are substantially identical. It is understood that elements and characteristics of one form of embodiment can conveniently be incorporated into other forms of embodiment without further clarifications.

DETAILED DESCRIPTION OF A PREFERENTIAL FORM OF EMBODIMENT

With reference to the attached drawings, the reference number 10 denotes in its entirety a conveying and pre-heating apparatus according to the present invention.

Figure 1:
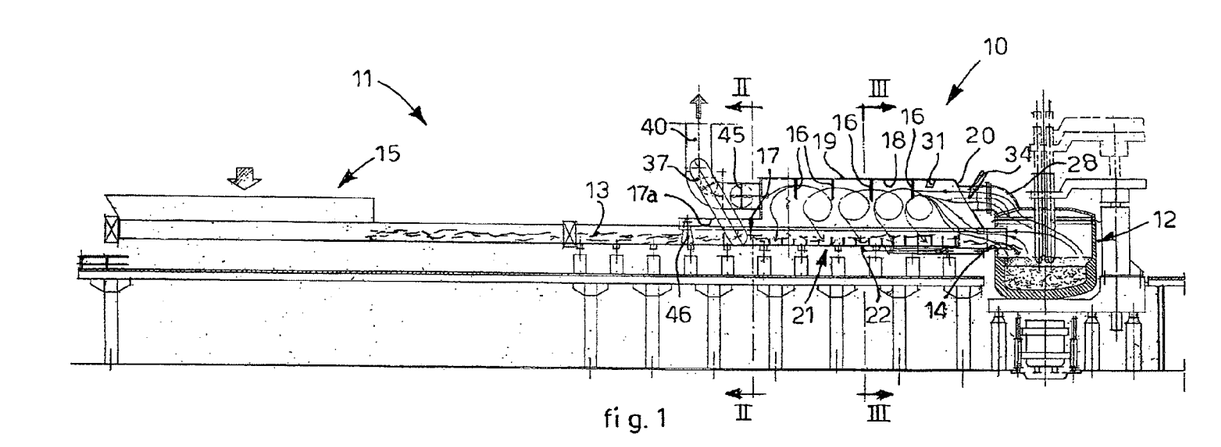
FIG. 1 is a schematic lateral view of a melting plant to which a conveying and pre-heating apparatus according to the present invention is applied.

With reference to FIG. 1, the apparatus 10 is installed in a melting plant 11, of a substantially known type and provided with a melting furnace 12, for example of the electric arc type, fed laterally through a loading aperture 14, with a metal charge 13 such as for example iron scrap, hot or cold sponge iron, cold pig iron or other.

The apparatus 10 according to the present invention allows to transport and pre-heat the metal charge 13 before it is introduced into the melting furnace 12.

In this case, the plant 10 comprises a loading module 15, in which the metal charge 13 is able to be deposited. Downstream of the loading module 15 the conveying and pre-heating apparatus 10 is disposed, into which the metal charge 13 is pre-heated before it is introduced into the melting furnace 12.

The apparatus 10 comprises a conveyor channel 21 conformed so as to cooperate with the loading aperture 14.

Figure 2:
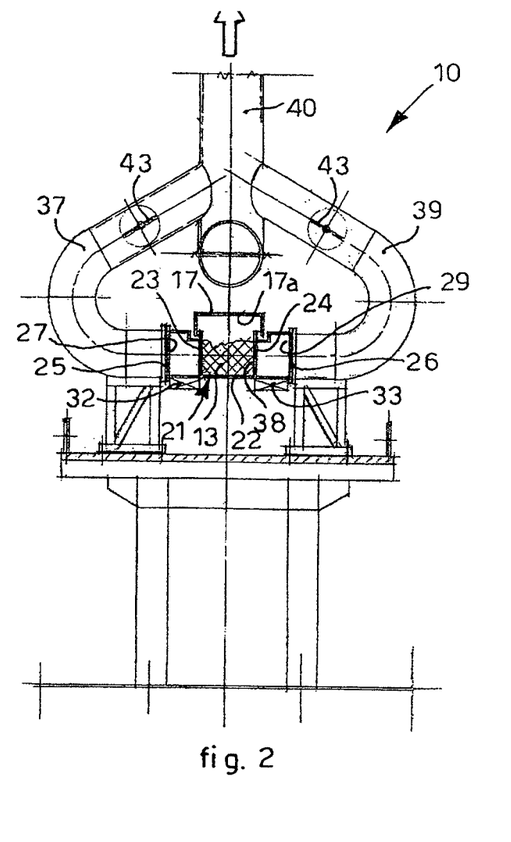
FIG. 2 is a section view from II to II of FIG. 1.
Figure 3:
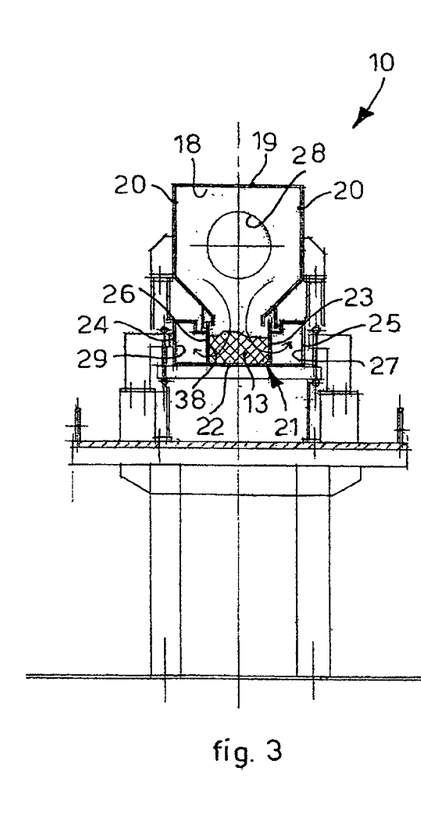
FIG. 3 is a section view from III to III of FIG. 1.

The conveyor channel 21 comprises a bottom wall 22, substantially horizontal, and two lateral walls 23 and 24 which define in this case a substantially U-shaped cross section (FIGS. 2 and 3).

The metal charge 13 advances in this case by means of a vibratory or oscillatory movement in a longitudinal direction of the conveyor channel 21 generated by a known vibration device.

The apparatus 10 also comprises one or more hoods 17 disposed above the conveyor channel 21 so as to define a pre-heating tunnel 17a functioning as an expansion chamber 18.

In particular, in correspondence with a final zone of the tunnel 17a, that is, a zone near the entry of the conveyor channel 21 into the melting furnace 12, the hoods 17 have in this case lateral walls 20 and a covering wall 19, so as to define the expansion chamber 18 above the conveyor channel 21.

The expansion chamber 18 can have different cross sections depending on the production techniques and the spaces available; it can also have the cross section decreasing in size in a direction opposite that in which the metal charge 13 advances.

The expansion chamber 18 has a volume such as to allow the fumes to expand, slowing their speed and lowering their temperature.

Inside the expansion chamber 18 one or more dividing partitions 16 may be present, which create an expansion and acceleration of the fumes, followed by another expansion, to accentuate the depositing of powders.

The effect of the expansion of the fumes inside the expansion chamber 18 is such that the speed is reduced from about 40 m/s to about 10 m/s-14 m/s, and the temperature of the fumes is reduced from about 1300° C.-1400° C. at exit from the melting furnace 12 to about 800° C.-1000° C. when they contact the metal charge 13.

Furthermore, the low speed at which the fumes pass through the metal charge 13 promotes their homogeneous contact with the metal charge 13, preventing localized overheating.

Figure 6:
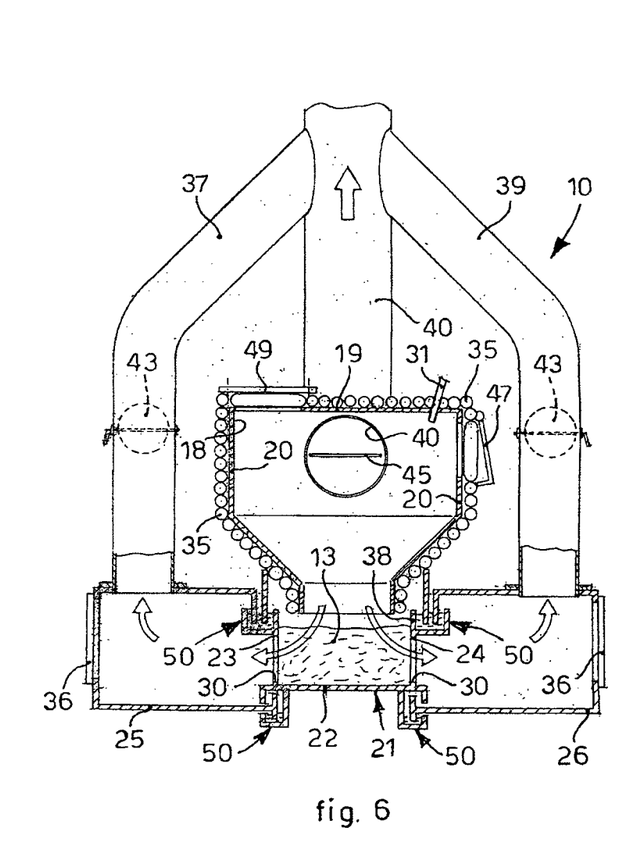
FIG. 6 is a variant of the section in FIG. 3.

As shown for example in FIG. 6, cooling panels 35, consisting of a plurality of tubes in which cooling water is made to pass, are associated with the lateral walls 20 and the covering wall 19 of the expansion chamber 18.

In other forms of embodiment, the lateral walls 20 and the covering wall 19 consist of tubular elements, adjacent to each other and seal welded along their length so as to constitute the expansion chamber 18. In this case the tubular elements not only have a cooling function but also a function of sealing and conveying the fumes.

In other forms of embodiment, the lateral walls 20 and the covering wall 19 are cooled by means of intense fins provided on the respective external surfaces to increase the heat exchange surface.

In the solution shown in FIG. 6, on one of the lateral walls 20 one or more safety doors 47 are provided, to allow an energy vent following possible explosions that might occur in the expansion chamber 18.

Figure 8:
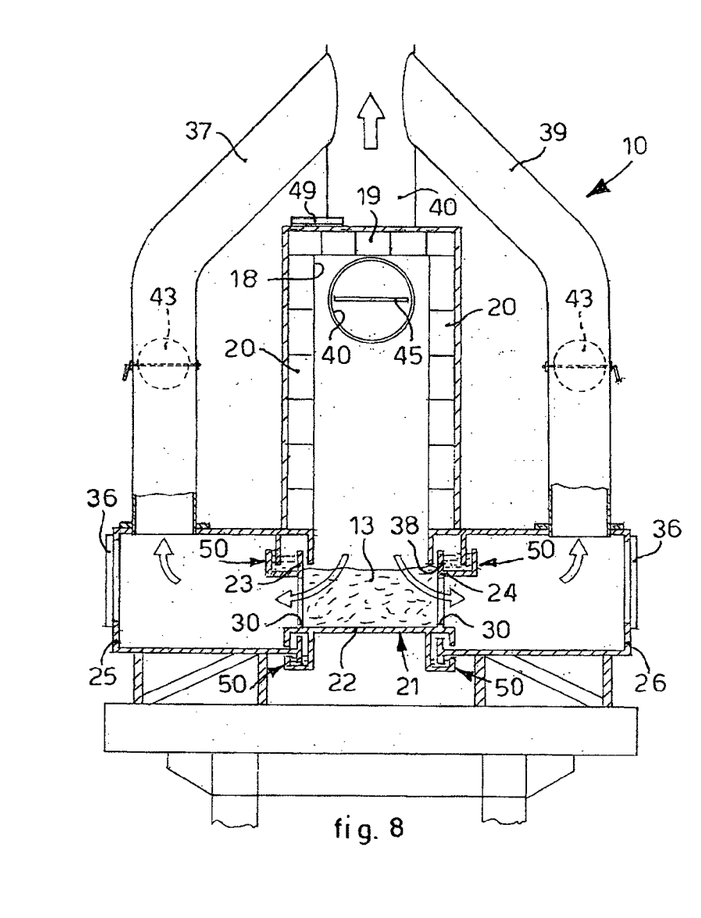
FIG. 8 is a variant of FIG. 6.

In the same way (FIGS. 6, 8 and 9), inspection doors 49 are provided on the covering wall 19, which allow access to the expansion chamber 18.

Inside the expansion chamber 18 (FIG. 1) a burner cooperates, only shown schematically, to provide for the combustion of non-combusted fumes exiting from the melting furnace 12.

In the same way, delivery lances 34 are provided to deliver nebulized water, to effect an active regulation of the temperature of the fumes, controlling them by means of temperature sensors disposed along the expansion chamber 18.

The apparatus 10 comprises a conveyor channel 28 disposed so as to connect the fourth hole of the melting furnace 12 with the expansion chamber 18.

The conveyor channel 28, when the loading aperture 14 is closed, allows to convey substantially the whole of the fumes produced inside the melting furnace 12 directly inside the expansion chamber 18.

The ratio between the usable passage surface of the conveyor channel 28 and the sizes of the cross section of the expansion chamber 18 is such that the expansion conditions of the fumes are obtained inside the expansion chamber 18 as described above.

According to another form of embodiment (FIG. 5), instead of using the conveyor channel 28, the cover of the melting furnace 12 is provided with a lateral aperture 55 which is connected directly with a first portion 56 of the expansion chamber 18. In particular, the first portion 56 of the expansion chamber is substantially divergent in the direction opposite the direction of advance of the metal charge 13, so as to impose on the fumes exiting from the melting furnace 12 a desired expansion, and is also disposed directly above the terminal discharge part of the conveyor channel 21.

The first portion 56, as described with reference to FIG. 6, has cooling panels 35 to cool its surfaces on its external surface.

Figure 5:
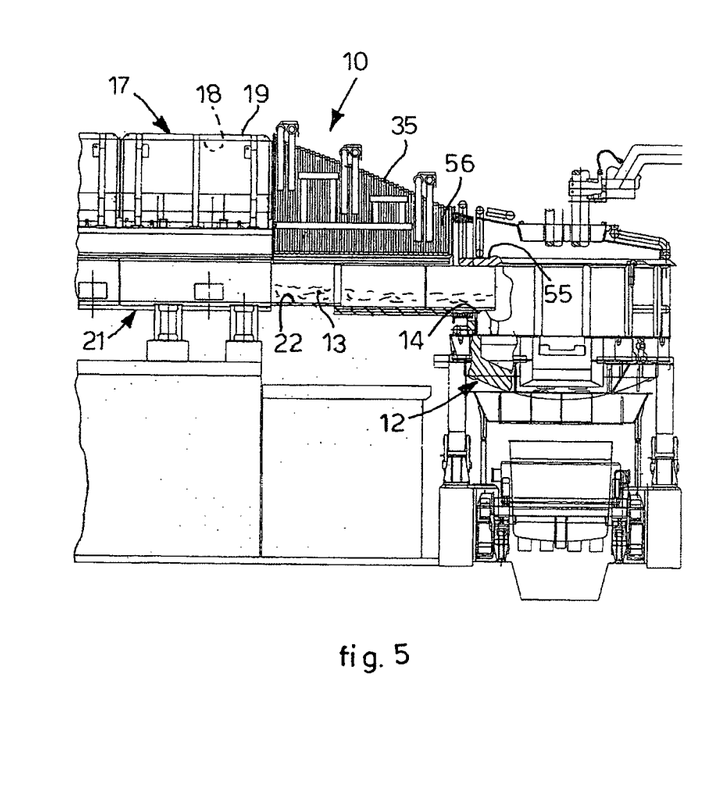
FIG. 5 shows a detail of FIG. 1 according to a variant.

This form of embodiment is more advantageously than other types of connection between the melting furnace 12 and the conveyor channel 21, since the losses of load due to curved pipes, narrow sections or other are considerably reduced and heat dissipations are limited, given that the fumes pass directly into the expansion chamber 18, hitting the metal charge directly which is about to be unloaded into the melting furnace 12.

Advantageously, along the whole length of the tunnel 17a, at the side of the lateral walls 23 and 24 of the conveyor channel 21 suction pipes 25 and 26 are provided (FIGS. 2, 3, 5 and 6), which define between them a central conveyor channel compartment of the metal charge 13.

Furthermore, the suction pipes 25 and 26 comprise the lateral walls 23 and 24.

Figure 9:
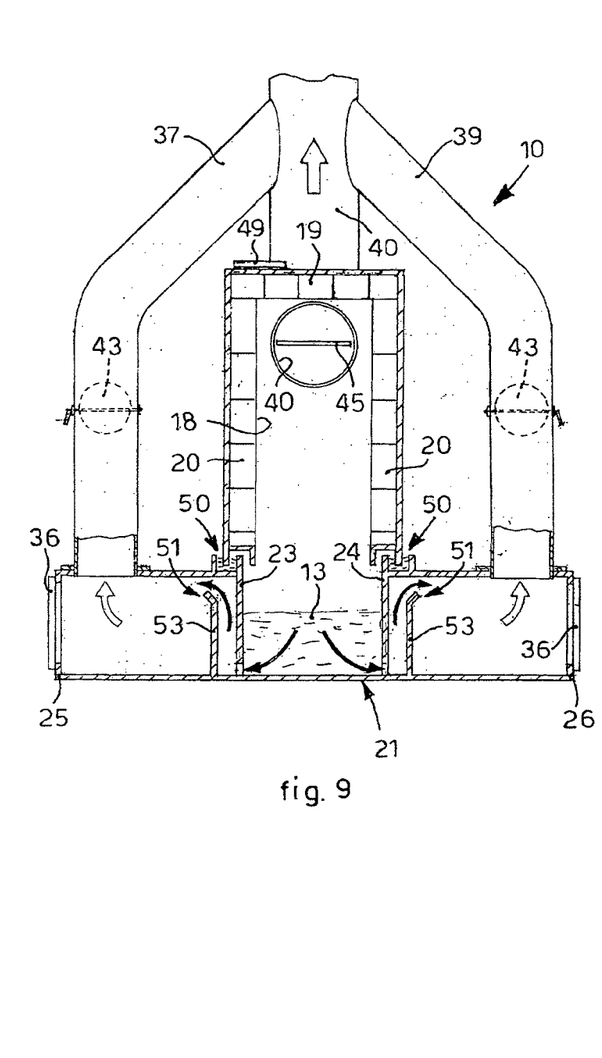
FIG. 9 is a variant of FIG. 6.

In the form of embodiment shown in FIGS. 2 and 3 and 9, the suction pipes 25 and 26 are made in a single piece with the conveyor channel 21.

In the form of embodiment shown in FIGS. 6 and 9, the suction pipes 25 and 26 are associated independently with the conveyor channel 21.

In this case, relative hydraulic seals 50 of a known type are provided to connect the suction pipes 25 and 26 to each other.

In one form of embodiment (FIG. 8), the suction pipes 25 and 26 are mounted solid with the base of the whole apparatus 10, while the conveyor channel 21, as we said, is subjected to oscillations or vibrations to transport the material. This solution allows to keep the two suction pipes 25 and 26 substantially stationary, to limit the mechanical stresses due to the movement of the conveyor channel 21.

Advantageously, each of the suction pipes 25 and 26 is provided with relative inspection doors 36, conformed to allow the selective inspection of the suction pipes 25 and 26 and/or to effect internal maintenance and cleaning.

The lateral walls 23 and 24 of the suction pipes 25 and 26 have passage apertures 30 or slits lateral at intervals (FIG. 4), which allow the fumes to be discharged lateral from the central conveyor channel compartment 38 toward the suction pipes 25 and 26.

Figure 4:
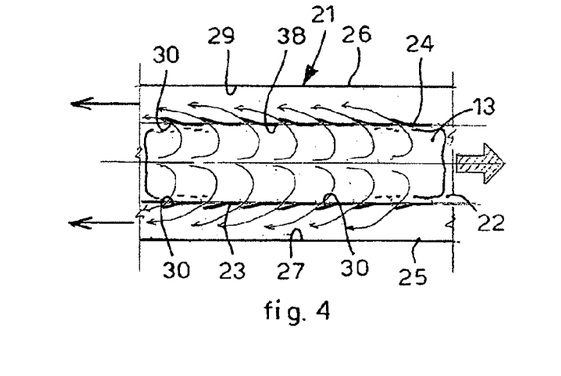
FIG. 4 is a schematic plane view of a detail of the apparatus in FIG. 1.
Figure 7:
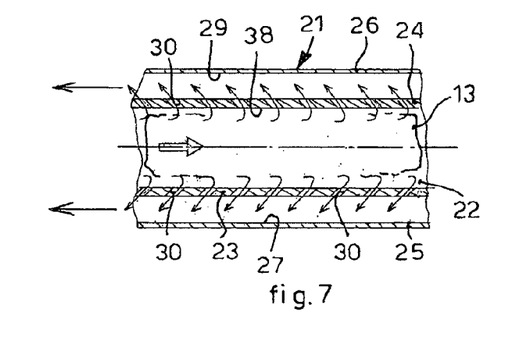
FIG. 7 is a variant of FIG. 4.

In the solutions shown in FIGS. 4 and 7, the passage apertures 30 are conformed as, or comprise, means which allow the fumes to exit but at the same time prevent the metal charge from getting jammed.

The passage apertures 30 are made in the lateral walls 23, 24 (FIG. 6) and, in other forms of embodiment can be made at least for a part on the bottom wall 22 too.

In this case, vibration members 32 and 33 are provided, cooperating with the suction pipes 25 and 26 (FIG. 3), so as to prevent, or at least limit, the sedimentation of powders or other impurities inside them.

In another form of embodiment (FIG. 9), the connection between the conveyor channel 21 and the suction pipes 25 and 26 is obtained by means of a labyrinth type mechanical seal 51 which comprises two separator elements 53 that extend substantially parallel to the lateral walls 23 and 24 of the conveyor channel 21, are solidly associated with the bottom of each suction pipe 25 and 26, and are lower I height than the lateral compartment 27 and 29.

In this form of embodiment, the lateral walls 23 and 24 can have the passage apertures 30, as already described, or provide a continuous aperture that extends for its entire length and only in the lower part of the lateral walls 23 and 24.

The fumes sucked in and made to pass through the scrap are obliged to follow a labyrinth-type path which lowers the speed of the fumes so as to deposit the powders and smaller fragments of metal charge on the bottom wall 22 of the conveyor channel 21, and thus to exert a first filtering of the fumes before they are treated.

Each of the suction pipes 25 and 26 is connected to a respective fume discharge pipe 37, 39.

In this case shown here, the discharge pipes 37, 39 converge in an exit pipe 40, connected to a fume suction plant of a substantially known type.

The exit pipe 40 also connects the expansion chamber 18 with the suction plant, so as to determine a desired depression to take in the fumes.

Inside each of the discharge pipes 37 and 39 a valve element 43 is disposed, able to be selectively activated to regulate the quantity of fumes taken in through the discharge pipes 37 and 39.

In this way, a desired suction of the fumes through the discharge pipes 37 and 39 can be guaranteed, thus allowing to regulate the pre-heating temperature of the metal charge 13, as a function of the type of metal charge 13 used.

The exit pipe 40 is also provided with a relative valve element 45, able to be selectively activated to regulate the heat exchange between the fumes and the metal charge 13.

The selective opening of the valve elements 43 and 45 allows to use the apparatus 10 with different scrap heating modes, possibly regulating the penetration into the metal charge 13, or only making the fumes pass inside the expansion chamber 18.

The apparatus 10 also comprises, in correspondence with the zone where the metal charge 13 enters inside the tunnel 17a, a static sealing device 46, of a known type, and/or of the dynamic type.

The apparatus 10 as described heretofore functions as follows.

By activating the suction plant upstream of the exit pipe 40, the stream of fumes produced in the melting furnace 12 is generated, inside the connection pipe 28, until they arrive inside the expansion chamber 18.

When the fumes reach the expansion chamber 18, they reduce speed and lower their temperature.

The suction action induces the fumes to pass through the passage apertures 30 provided along the tunnel 17a in proximity with the bottom wall 22 of the conveyor channel 21, thus passing through the moving metal charge 13 from the top to the bottom.

By regulating the opening of the valve elements 43 and 45, depending on the type of metal charge 13 used, it is possible to regulate the heating temperature of the metal charge 13 itself.

By inducing the passage of the fumes through the cross section of the metal charge 13, a substantially uniform heating is determined of the metal charge 13, with optimum use of the heat energy of the fumes.

It is clear that modifications and/or additions of parts may be made to the apparatus 10 as described heretofore, and that a person of skill in the art shall certainly be able to achieve many other equivalent forms of conveying and pre-heating apparatus for conveying iron scrap in a melting plant, having the characteristics as set forth in the claims and hence all coming within the field of protection defined thereby.

For example, according to another variant, the passage apertures 30 can have an adjustable amplitude depending on the type of metal charge 13 provided, or can comprise protective grids to prevent parts of the metal charge 13 from entering inside the suction pipes 25 and 26.

The invention claimed is:

1. Apparatus for pre-heating and conveying a metal charge to a melting furnace of a melting plant, comprising:
    a conveyor channel capable of advancing a metal charge to a lateral loading aperture of the melting furnace, having lateral walls and a bottom wall that define a substantially U-shaped cross section,
    a hood at least partially disposed above the conveyor channel and having a tunnel wherein at least part of the fumes generated from the melting furnace advance into the hood,
    an expansion chamber within the hood and at least partially located above the metal charge and the conveyor channel,
    a connection pipe disposed between a fume exit of the melting furnace and the expansion chamber, and in a direct fluid communication from the melting furnace to the expansion chamber, to introduce a substantial amount of fumes generated inside the melting furnace directly into the expansion chamber, to reduce the passage of the fumes through the conveyor channel;
    at least one suction pipe disposed within the lateral walls of the conveyor channel; and
    a longitudinal portion of the conveyor channel having at least one passage apertures disposed within the lateral walls and in fluid communication with one the at least one suction pipe;
    wherein the fumes entered from the melting furnace through the connection pipe do not directly contact the metal charge before the fumes reduce their speed and temperature in the expansion chamber, in order to avoid localized melting in the metal charge,
    wherein an internal volume of the expansion chamber is a function of the flow rate of fumes generated from the melting furnace so that the fumes remain in the expansion chamber for a time period of at least 1.5 seconds before contacting to the metal charge on the conveyor channel.

2. The apparatus of claim 1 wherein said time period is between about 1.5 seconds and about 6 seconds.

3. The apparatus of claim 1 wherein the volume of said expansion chamber is between about 200 m$^3$ and about 600 m$^3$.

4. The apparatus of claim 1 wherein said expansion chamber has a cross section whose size decreases in the direction opposite to the direction of advance of the metal charge.

5. The apparatus of claim 1 further comprising a plurality of partitions inside said expansion chamber, wherein said partitions are capable of creating a cascade expansion against the longitudinal movement of the fumes.

6. The apparatus of claim 1 wherein said expansion chamber further comprises at least one internal surface that is insulated.

7. The apparatus of claim 6 further comprising a cooling means within the expansion chamber.

8. The apparatus of claim 6 further comprising a nebulizer.

9. The apparatus of claim 1 wherein said suction pipes are connected to and separate from the conveyor channel.

10. The apparatus of claim 1 further comprising a suction means in fluid communication with said suction pipes.

11. The apparatus of claim 1 further comprising a vibratory means in communication with said suction pipes.

* * * * *